United States Patent [19]  
Anzel

[11] Patent Number: 5,020,746  
[45] Date of Patent: Jun. 4, 1991

[54] METHOD FOR SATELLITE STATION KEEPING
[75] Inventor: Bernard M. Anzel, Venice, Calif.
[73] Assignee: Hughes Aircraft Company, Los Angeles, Calif.
[21] Appl. No.: 415,005
[22] Filed: Sep. 29, 1989
[51] Int. Cl.⁵ .............................................. B64G 1/26
[52] U.S. Cl. ..................................... 244/169; 244/164
[58] Field of Search ........... 244/164, 169, 172, 158 R, 244/52, 3.22

[56] References Cited  
U.S. PATENT DOCUMENTS  
4,407,469 10/1983 Fox ....................................... 244/169

Primary Examiner—Joseph F. Peters, Jr.  
Assistant Examiner—Anne E. Bidwell  
Attorney, Agent, or Firm—Steven M. Mitchell; Robert A. Westerlund; Wanda K. Denson-Low

[57] ABSTRACT

An improved method for satellite station keeping is disclosed. The method provides for station keeping of a three axis stabilized satellite 10 using only two thrusters 20 and 22. The thrusters 20 and 22 can be ion or liquid propulsion thrusters and are mounted on the anti-nadir face 18 of the satellite 10. The north thruster 20 is canted at an angle Θ from the north-south axis 16 of the satellite 10 in a northern direction and the south thruster 22 is canted at the angle Θ from the north-south axis 16 in a southern direction. Both thrusters 20 and 22 are also translated to the east or west along an east-west axis 14 of the satellite 10 and swiveled at variable angles $\alpha_1$ and $\alpha_2$ respectively. A specific teaching of the invention discloses techniques for determining the angles $\alpha_1$ and $\alpha_2$ and the firing positions for the thrusters 20 and 22 to maintain the satellite 10 in a stationary orbit. In a specific embodiment, a backup thruster 24 is provided to counter the radial acceleration buildup from a failure of one of the thrusters 20 or 22. Also, in a specific embodiment, first and second slide mechanisms are provided to translate the first and second thrusters 20 and 22 to the east or west along the east-west axis 14 of the satellite 10 for a change in the angles $\alpha_1$ or $\alpha_2$ in order to maintain the lines of thrust from the thrust of the thrusters 20 and 22 respectively through the center-of-gravity of the satellite 10.

19 Claims, 3 Drawing Sheets

METHOD FOR SATELLITE STATION KEEPING

BACKGROUND OF THE INVENTION

1. Field of the Invention

The present invention relates to satellites. More specifically the present invention relates to satellite station keeping.

While the present invention is described herein with reference to illustrative embodiments for particular applications, it should be understood that the invention is not limited thereto. Those having ordinary skill in the art and access to the teachings provided herein will recognize additional modifications, applications and embodiments within the scope thereof and additional fields in which the present invention would be of significant utility.

2. Description of the Related Art

Synchronous satellites orbit the earth with the same revolution rate as that of the earth. Accordingly the satellite appears above a fixed point on the earth. Hence, synchronous satellites are also referred to as "geostationary" satellites and operate within a "stationary" orbit. Synchronous satellites are useful for many applications including weather and communications applications.

It is generally well known in the art that various forces act on synchronous satellites which act to move the satellite out of stationary orbit. These forces are due to several sources including the gravitational effects of the sun and moon, the elliptical shape of the earth and solar radiation pressure. To counter these forces, synchronous satellites are equipped with propulsion systems that are fired at intervals in order to maintain station at a desired orbit. This requires control of the inclination, eccentricity and drift of the satellite. Inclination is the north-south position of the satellite relative to the earth's equator. Eccentricity is the measure of the non-circularity of the satellite orbit. That is, the measure of the variation of the distance the satellite is from the earth as the earth and satellite rotate. Finally, drift is the position of the satellite in an east-west direction relative to a sub-satellite point on the earth.

Station keeping was first achieved with the Syncom III satellite, a Hughes Aircraft Company spin-stabilized communications satellite launched by NASA in 1964. Current satellites are either spin-stabilized or three-axis stabilized satellites. Spin-stabilized satellites use the gyroscopic effect of the satellite spinning to help maintain the satellite orbit. For certain applications, the size of the satellite militates in favor of a three-axis stabilization scheme.

Current three-axis stabilized satellites use liquid propulsion systems for station keeping. One set of thrusters are used for controlling the inclination while a second set of thrusters are used for controlling the drift and eccentricity of the satellite. As the cost of satellite propulsion systems is directly related to the number of thrusters required for station keeping, there is an ongoing need in the art to reduce the number of thrusters required for satellite propulsion and station keeping.

Further, liquid propulsion systems have a limited life because of the limited supply of fuel on board the satellite. Thus, there is an additional need in the art for a satellite thruster for use on three-axis stabilized satellites with longer life than current liquid propulsion thrusters.

SUMMARY OF THE INVENTION

The need in the art is addressed by the improved method for satellite station keeping of the present invention. The method provides for station keeping of a three axis stabilized satellite using only two thrusters. The thrusters can be ion or liquid propulsion thrusters and are mounted on the anti-nadir face of the satellite. The north thruster is canted at an angle $\Theta$ from the north-south axis of the satellite in a northern direction and the south thruster is canted at the angle $\Theta$ from the north-south axis in a southern direction. Both thrusters are also translated to the east or west along an east-west axis of the satellite and swiveled at variable angles $\alpha_1$ and $\alpha_2$ respectively. A specific teaching of the invention discloses techniques for determining the angles $\alpha_1$ and $\alpha_2$ and the firing positions for the thrusters in order to maintain the satellite in a stationary orbit. In a specific embodiment, a backup thruster is provided to counter the radial acceleration buildup from a failure of one of the thrusters. Also, in a specific embodiment, first and second slide mechanisms are provided to translate the first and second thrusters to the east or west along the east-west axis of the satellite for a change in the angles $\alpha_1$ or $\alpha_2$ in order to maintain the lines of thrust from the thrust of the thrusters respectively through the center-of-gravity of the satellite.

DESCRIPTION OF THE INVENTION

Figure 1:
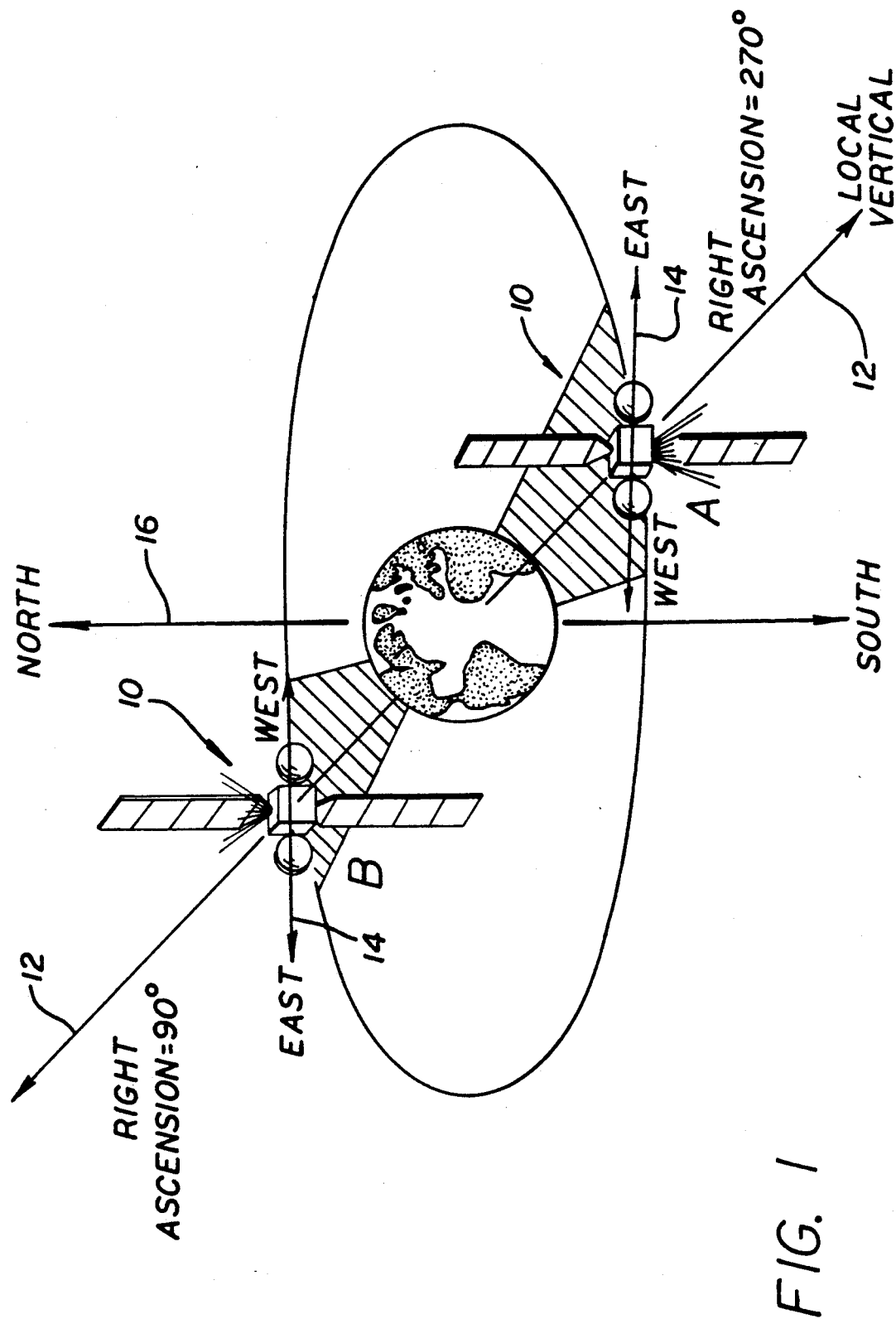
FIG. 1 shows a three-axis stabilized satellite in a stationary orbit about the earth in two different positions to illustrate the improved method for satellite station keeping of the present invention.

FIG. 1 shows a three-axis stabilized satellite 10 in a stationary orbit about the earth in a first position A and a second position B to illustrate the improved method for satellite station keeping of the present invention. The nadir direction is the direction toward the earth, and the anti-nadir direction is the direction away from the earth. Thus, the local vertical 12, as shown in FIG. 1, is the line through the earth and satellite 10 which represents the nadir and anti-nadir directions. A set of local coordinates for the satellite 10 is defined by the local vertical 12 and by an east-west axis 14 and a north-south axis 16. The origin of the coordinates is the center-of-gravity (C.G.) of the satellite 10.

Figure 2:
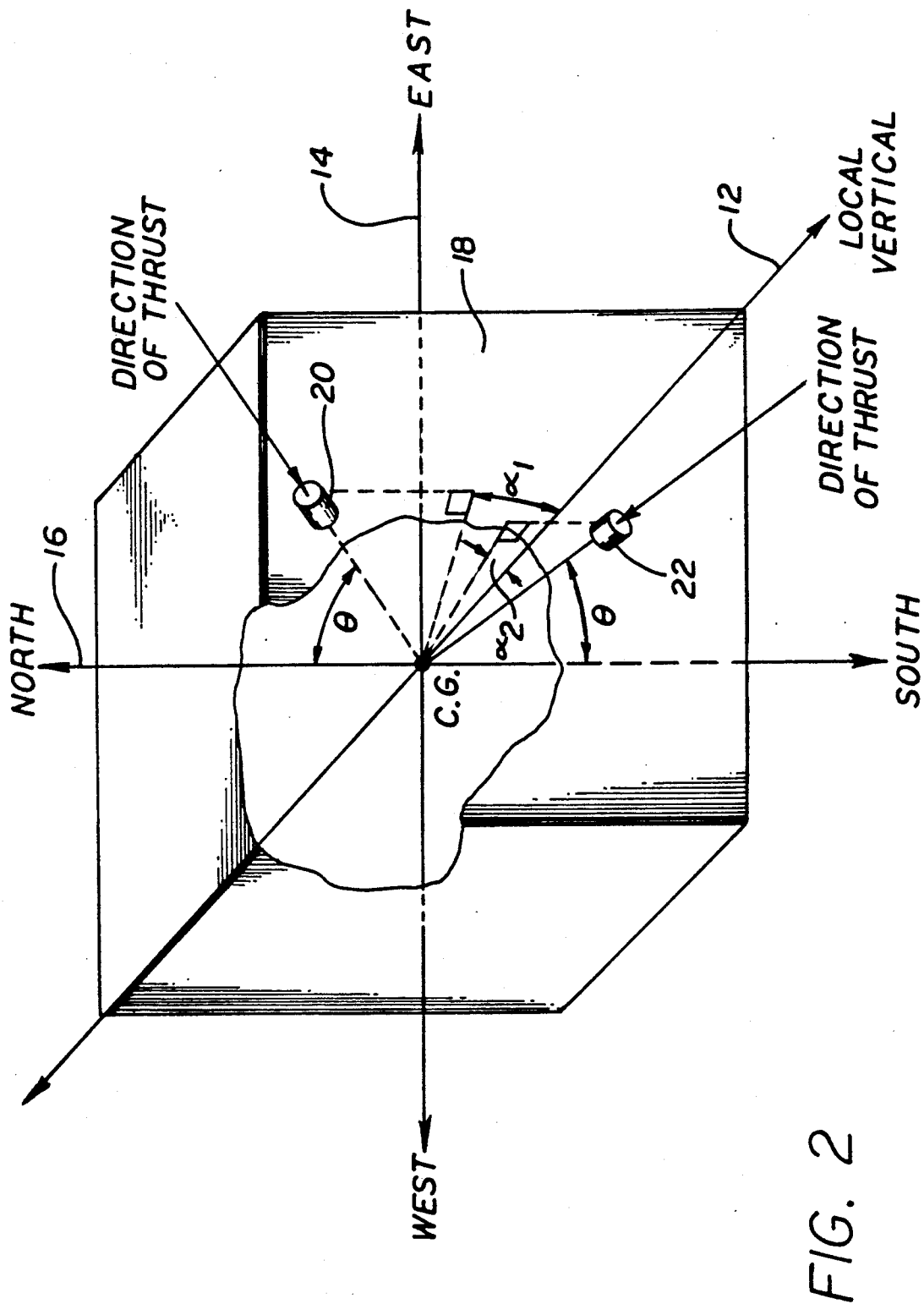
FIG. 2 shows a simplified three-dimensional view of the three-axis satellite with the improved method for satellite station keeping of the present invention.

FIG. 2 shows a simplified three-dimensional view of the three-axis stabilized satellite 10 with the improved method for satellite station keeping of the present invention. In the preferred embodiment, the satellite 10 includes two thrusters 20 and 22. The thrusters 20 and 22 are mounted on the anti-nadir face 18 of the satellite 10 and are canted away from the anti-nadir face 18. The cant angles are such that the thrust lines pass through the satellite center-of-gravity. Thus, the thrust lines of the north thruster 20 and the south thruster 22 make an angle of Θ with the north-south axis 16 in a northern and southern direction respectively. The acceleration provided by the north thruster 20 has two components, one along the north-south axis 16 in a southern direction and one along the local vertical 12 in the nadir direction. Similarly, the acceleration provided by the south thruster 22 has two components, one along the north-south axis 16 in a northern direction and one also along the local vertical 12 in the nadir direction. Thus, the satellite 10 inclination is controlled by the thrust along the north-south axis 16 and the satellite 10 eccentricity is controlled by the thrust along the local vertical 12.

Drift control is provided by translating both thrusters 20 and 22 either to the east side or to the west side of the north-south axis 16 as appropriate for the drift control required for the desired orbit. The thrusters 20 and 22 are then swiveled such that the thrust lines pass through the center-of-gravity of the satellite 10. As shown in FIG. 2 for a translation of the thruster 20 and the thruster 22 to the east, the projection of the thrust lines onto the plane defined by the local vertical 12 and east-west axis 14 make an angle of $\alpha_1$ and $\alpha_2$ respectively with the local vertical 12 resulting in tangential acceleration. The angles $\alpha_1$ and $\alpha_2$ may be the same or the angles may be different depending upon a particular application as discussed more fully below. Thus, all three components of acceleration, north-south, est-west and radial, would be present upon thrusting. Those skilled in the art will appreciate that the type of mechanism used to swivel the thrusters 20 and 22 may vary without departing from the scope of the present invention. For example, a gimbal and servo mechanism may be utilized.

In most cases, the optimum time for providing north-south corrections to maintain the required inclination is at a right ascension (R.A.) of 90° for negative acceleration (south correction) and 270° for positive acceleration (north correction). (Right ascension is the angle measured in the equatorial plane from a reference position of the sun at vernal equinox to the satellite position.) This is because most changes in inclination are produced by forces acting along a R.A. of 90°. For the improved method for satellite station keeping of the present invention, the north thruster 20 provides negative acceleration and the south thruster 22 provides positive acceleration. Thus, the north thruster 20 should be fired at R.A. = 90° and the south thruster 22 should be fired at R.A. = 270° as shown in FIG. 1. If the firing arcs are equal, each thruster 20 and 22 will provide one-half the required north-south velocity increment. Those skilled in the art will recognize that the frequency with which the thrusters 20 and 22 are fired may vary without departing from the scope of the present invention. For example, each thruster 20 and 22 may be fired more or less often than once per revolution without departing from the scope of the present invention.

Due to the cant angle Θ, of the thrusters 20 and 22, a net radial velocity component is produced with each firing. A radial velocity component results in a change in orbit eccentricity. However, where both radial velocity components are nadir directed and occur 180° apart in space, the net change in eccentricity is zero. Thus, for one-half the firing cycle, the eccentricity change will exist before it is canceled by the second firing. In most cases, this small eccentricity change which results in a diurnal longitude variation does not move the satellite outside of the acceptable satellite station keeping area. Those skilled in the art with access to the present teachings will design satellites 10 with amplitudes for the firing arcs that result in peak diurnal longitude variations that are acceptable for a specific application.

Another effect on the orbit produced by a radial velocity component is a shift in mean longitude. Since each radial component is nadir directed, the shifts are toward the east. This shift can be compensated for by producing an equal and opposite drift acceleration toward the west by using the appropriate swivel angle $\alpha$ for the thrusters 20 and 22. The tangential acceleration provided by the swivel angles $\alpha_1$ and $\alpha_2$ of the thrusters 20 and 22 respectively is also used to counter longitudinal acceleration produced because of the triaxiality of the earth. The tightest drift control is achieved by allowing the firing of each thruster 20 and 22 to produce its own soft limit cycle. That is, provide enough tangential acceleration with the firing of each thruster 20 and 22 to complete an entire cycle in one-half orbit. For this strategy, the swivel angles $\alpha_1$ and $\alpha_2$ for the north thruster 20 and south thruster 22 respectively are equal and minimum and given by the equation:

$$\alpha_1 = \alpha_2 = \sin^{-1}[(19.38)A/(\tan \Theta)\mathring{I}] \qquad [1]$$

where
A = drift acceleration, deg./day² (earth triaxiality)
$\mathring{I}$ = orbit normal precession rate, deg./year (sun-moon gravity)
Θ = thruster cant angle In the preferred embodiment, $\alpha_1$ is equal to $\alpha_2$. However, for certain applications it may be beneficial for one thruster 20 or 22 to provide all the tangential acceleration. In this case, the soft limit cycle period will be one orbit and the swivel angles are given by the equation:

$$\alpha_1 \text{ or } \alpha_2 = \sin^{-1}[(38.76)A/(\tan \Theta)\mathring{I}; \alpha_1 \text{ or } \alpha_2 = 0 \qquad [2]$$

For this case, the unequal swivel angles permit partial correction or orbit eccentricity simultaneously with corrections for drift acceleration.

Solar radiation pressure causes eccentricity to change at right angles to the sun direction. Since the sun moves 360° in one year relative to the earth, this change traces out a circle. The size of the circle may be reduced by countering along each of two orthogonal axes. One axis is the line connecting the two thruster firing centers at R.A. = 90° and R.A. = 270°. It is along this axis that the differential tangential velocity increments act to reduce eccentricity. It is also possible to reduce eccentricity along the 0°–180° axis by using unequal thrusting arcs.

For example, as known to those skilled in the art, drift acceleration, A, is a function of satellite longitude. For U.S. domestic communications satellites, the approximate longitude band is 80° to 125° west. Those skilled in the art will recognize that for this longitude:

$A \leq 1 \times 10^{-3}$ deg./day², and $\mathring{I}$ = 0.852 deg./year, average long term orbit normal precession rate.

Thus, as calculated using equation [1] for Θ = 35°, $\alpha_1 = \alpha_2 = 1.86°$. Those skilled in the art will recognize that the thruster cant angle Θ will vary depending upon the size of the satellite 10 and the mounting location for the thrusters 20 and 22. For the satellite 10 with the improved method for satellite station keeping of the present invention, Θ is chosen as 35° for illustrative purposes. Also, for the satellite 10, the anti-nadir face 18 is chosen as being 45 inches from the center-of-gravity of the satellite 10. Those skilled in the art will recognize that the distance from the satellite 10 center-of-gravity to the anti-nadir face 18 will vary depending upon the type of satellite 10. Thus, the east or west translation of the thrusters 20 and 22 is:

$$\text{Translation} = 45 \tan 1.86° = 1.46 \text{ inches} \qquad [3]$$

As known by those skilled in the art, the long term precession rate of the orbit normal, İ, varies from a minimum of 0.754 deg./year to a maximum of 0.950 deg./year over an 18.6 year cycle. Thus, the change in $\alpha_1$ and $\alpha_2$ to track this variation is $-0.19°$ to $0.24°$. Generally, these changes are required relatively infrequently, such as every several months, and can be commanded from the ground or provided by the satellite 10 without departing from the scope of the present invention. This same long-period variation in orbit normal precession rate, İ, will also require changes in the magnitude of the firing arcs which can also be commanded at approximately the same frequency from the ground or provided by the satellite 10 without departing from the scope of the present invention. For a more detailed mathematical analysis see the related material on Controlling a Stationary Orbit Using Electric Propulsion by Bernard M. Anzel of the Space and Communications Group Systems Laboratories of Hughes Aircraft Company as presented to the 1988 International Electric Propulsion Conference in West Germany.

The type of thruster 20 and 22 may vary without departing from the scope of the present invention. For example, as known to those skilled in the art, ion thrusters have a particularly high specific impulse as compared to liquid propulsion thrusters (approximately 3000 versus 200 seconds respectively). This high specific impulse is particularly beneficial in correcting orbital inclination, which requires almost all the velocity needed for station keeping. Furthermore, the life of an ion thruster is typically much longer than for a liquid propulsion thruster resulting in increased satellite station keeping life. Thus, ion thrusters may have significant advantages over liquid propulsion thrusters for use in the satellite 10 with the improved method for satellite station keeping of the present invention. Those skilled in the art and with access to the present teachings will use the type of thruster 20 and 22 that is appropriate for a particular application.

As known to those skilled in the art, satellites often have backup thrusters for use in the event one of the primary thrusters fails. For the preferred embodiment of the satellite 10 with the improved method for satellite station keeping of the present invention, the satellite 10 has two primary thrusters 20 and 22. In the event one of the thrusters 20 or 22 fails, a secular eccentricity buildup will occur due to the uncompensated radial coupling of the single remaining thruster 20 or 22.

Figure 3:
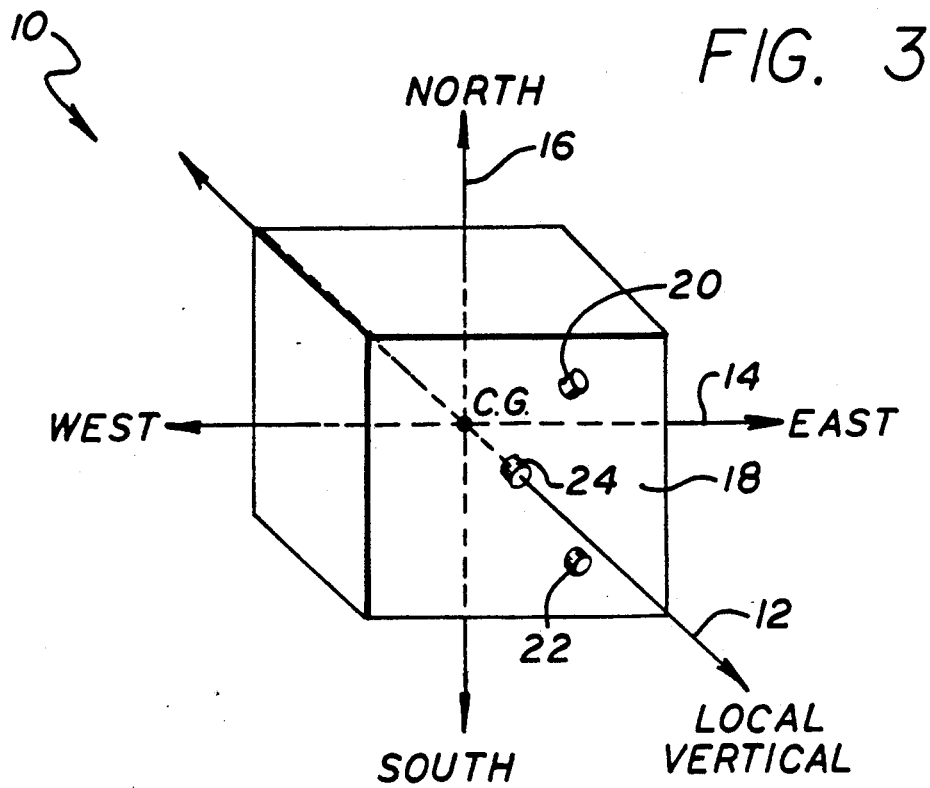
FIG. 3 shows a simplified three-dimensional view of the three-axis satellite with the improved method for satellite station keeping of the present invention in a specific embodiment including the use of a backup thruster.

FIG. 3 shows a simplified three-dimensional view of the three-axis stabilized satellite 10 with the improved method for satellite station keeping of the present invention in a specific embodiment including the use of a backup thruster 24. The backup thruster 24 is mounted on the anti-nadir face 18 of the satellite 10 along with the thrusters 20 and 22, but the direction of thrust of the backup thruster 24 is along the local vertical 12 in the nadir direction and through the center-of-gravity of the satellite 10.

To counter the eccentricity buildup resulting from a failure of a thruster 20 or 22, the backup thruster 24 is fired in a point in space 180° from where the remaining thruster 20 or 22 fires. The firing arc for the backup thruster 24 is shorter than the firing arc for the remaining primary thruster 20 or 22 in order to cancel the radial velocity component produced by that remaining thruster. The remaining primary thruster 20 or 22 is still used to control the inclination, but the firing period will need to be doubled and at the appropriate point in space to compensate for the nonusable thruster 20 or 22. In the preferred embodiment, $\alpha_1 = \alpha_2$, thus, the remaining thruster 20 or 22 will also properly control the drift since the doubled firing arc will provide the proper east-west velocity component from a single thruster 20 or 22. Those skilled in the art will recognize that the type of thruster used for the backup thruster 24 may vary without departing from the scope of the present invention. For example, the backup thruster 24 may be an ion thruster or a liquid propulsion thruster. Also, the backup thruster 24 may be used to control eccentricity under normal conditions (that is where thrusters 20 and 22 are operating properly) by firing thruster 24 at designated points in space at the proper frequency.

Figure 4:
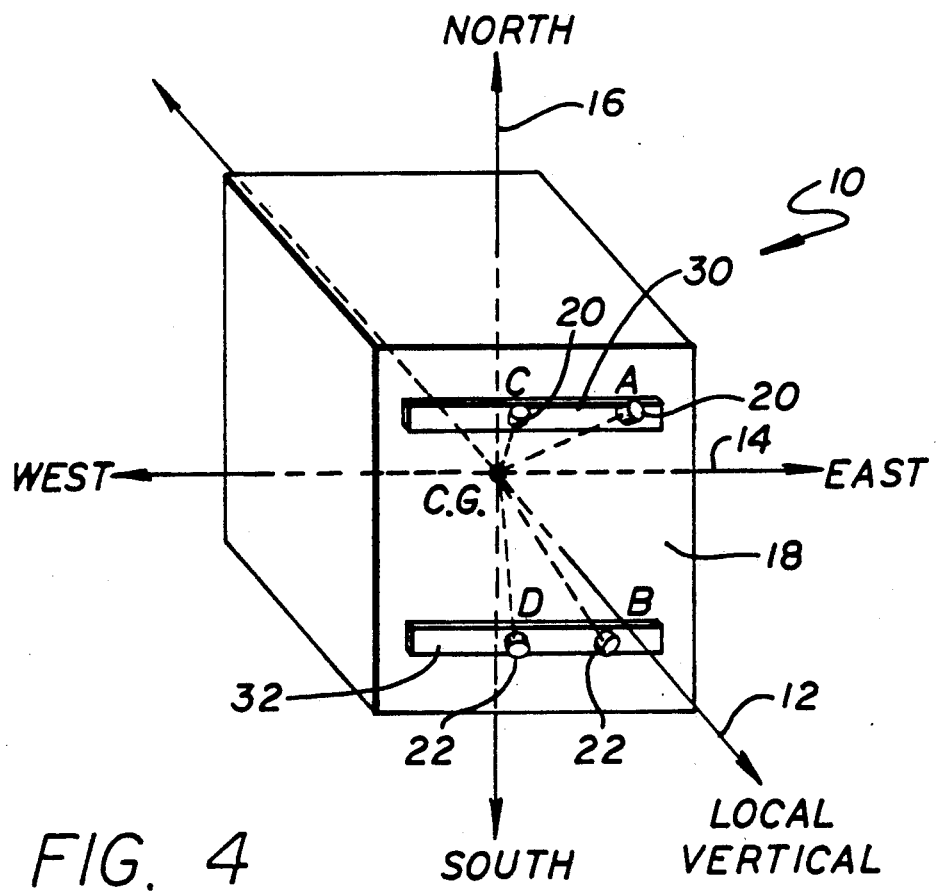
FIG. 4 shows a simplified three-dimensional view of the three-axis stabilized satellite 10 with the improved method for satellite station keeping of the present invention in a specific embodiment including the use of first and second slide mechanisms to control the translation of the thrusters.

FIG. 4 shows a simplified three-dimensional view of the three-axis stabilized satellite 10 with the improved method for satellite station keeping of the present invention in a specific embodiment including the use of first and second slide mechanisms 30 and 32 to control the translation of the thrusters 20 and 22. The slide mechanisms 30 and 32 are mounted on the anti-nadir face 18 of the satellite 10 along with the thrusters 20 and 22 and may be implemented by rail and servo mechanisms or other components without departing from the scope of the present invention. The slide mechanisms 30 and 32 allow the thruster 20 and 22 to be moved in an east-west direction along the satellite 10 from first positions A and B respectively to second positions C and D respectively such that the lines of force from the thrusters 20 and 22 are maintained through the center of gravity of the satellite 10. Those skilled in the art will recognize that the slide mechanisms 30 and 32 may be controlled by commands from a ground based station or automatically by circuitry on the satellite 10 in response to changes in the swivel angles $\alpha_1$ and $\alpha_2$.

Thus, the present invention has been described herein with reference to a particular embodiment for a particular application. Those of ordinary skill in the art with access to the teachings of the present invention will recognize additional modifications, applications and embodiments within the scope of the invention. For example, the improved method for satellite station keeping of the present invention is not limited to earth orbit satellites, but may be used for orbit or maneuvering control of other types of satellites or spacecraft.

It is therefore intended by the appended claims to cover any and all such modifications, applications and embodiments within the scope of the present invention.

Accordingly,

What is claimed is:

1. An improved method for station keeping of three-axis stabilized satellites comprising the steps of:
   a) mounting first and second thrusters on the anti-nadir face of a satellite;

b) canting said first thruster at an angle $\Theta$ in a first direction and at an angle $\alpha_1$ in a second direction from said face of said satellite with the line of force from the thrust of said first thruster passing through the center-of-gravity of said satellite;

c) canting said second thruster at an angle $\Theta$ in a third direction opposite from said first direction and at an angle $\alpha_2$ in said second direction from said face of said satellite with the line of force from the thrust of said second thruster passing through the center-of-gravity of said satellite;

d) providing first and second servo mechanisms to control the angles $\alpha_1$ and $\alpha_2$ respectively;

e) providing first and second slide mechanisms to translate said first and second thrusters respectively along said face of said satellite in said second direction to maintain said lines of force from said thrusters through said center-of-gravity of said satellite for a change in said angles $\alpha_1$ or $\alpha_2$ respectively; and f) firing said first and second thrusters for the required length of time and with the appropriate angles for $\alpha_1$ and $\alpha_2$ to maintain the proper stationary orbit.

2. The method of claim 1 wherein said first and second thrusters are ion thrusters.

3. The method of claim 1 including the step of firing said second thruster at a point in space opposite from the point where said first thruster is fired in order to counter the radial acceleration from the firing of said first thruster.

4. The method of claim 1 including the step of providing a backup thruster to counter the radial acceleration buildup resulting from a failure of said first or second thruster.

5. The method of claim 4 wherein said backup thruster is an ion thruster.

6. The method of claim 4 wherein said backup thruster is mounted on the anti-nadir face of said satellite such that the line of force from said thruster passes through the center-of-gravity of said satellite in a nadir direction.

7. An improved station keeping system for providing station keeping control for three-axis stabilized satellites, said improved station keeping system comprising:

first thruster means mounted on the anti-nadir face of said satellite and canted at an angle $\Theta$ in a first direction and at an angle $\alpha_1$ in a second direction and adapted for selectively providing thrust;

first servo means for controlling said angle $\alpha_1$ of said first thruster;

second thruster means mounted on said anti-nadir face of said satellite and canted at said angle $\Theta$ in a third direction opposite from said first direction and at an angle $\alpha_2$ in said second direction and adapted for selectively providing thrust;

second servo means for controlling said angle $\alpha_2$ of said second thruster; and controller means for controlling said thrust provided by said first and second thruster means and for determining said angles $\alpha_1$ and $\alpha_2$ such that the proper stationary orbit is maintained by said satellite.

8. The invention of claim 7 wherein said first and second thruster means are ion thrusters.

9. The invention of claim 7 wherein said first and second thruster means are liquid propulsion thrusters.

10. The invention of claim 7 wherein said first and second servo means are gimbal and servo systems.

11. The invention of claim 7 wherein the lines of force from said thrust of said first and second thruster means pass through the center-of-gravity of said satellite.

12. The invention of claim 7 wherein said controller means provides said thrust from said second thruster means at a point in space opposite from where said thrust from said first thruster means is provided in order to counter the radial acceleration from said thrust from said first thruster means.

13. The invention of claim 7 including backup thruster means for providing thrust in a radial direction to counter the radial acceleration buildup from a failure of said first or second thruster means.

14. The invention of claim 13 wherein said backup thruster is an ion thruster.

15. The invention of claim 13 wherein said backup thruster means is mounted on said anti-nadir face of said satellite with the line of force from the thrust of said backup thruster passing through the center-of-gravity of said satellite in the nadir direction.

16. The invention of claim 7 wherein said first servo means includes first slide means for translating said first thruster along said face of said satellite in said second direction to maintain the line of force from said thrust of said first thruster through the center-of-gravity of said satellite.

17. The invention of claim 16 wherein said controller means controls said first slide means to provide the proper translation of said first thruster.

18. The invention of claim 7 wherein said second servo means includes second slide means for translating said second thruster along said face of said satellite in said second direction to maintain the line of force from said thrust of said second thruster through the center-of-gravity of said satellite.

19. The invention of claim 18 wherein said controller means controls said second slide means to provide the proper translation of said second thruster.

* * * * *